United States Patent
Kolberg et al.

(10) Patent No.: US 8,784,991 B2
(45) Date of Patent: Jul. 22, 2014

(54) PROCESS FOR COATING METALLIC SURFACES WITH AN AQUEOUS COMPOSITION, AND THIS COMPOSITION

(75) Inventors: Thomas Kolberg, Heppenhelm (DE); Manfred Walter, Linsengericht (DE); Peter Schubach, Nidderau (DE)

(73) Assignee: Chemetall GmbH (DE)

( * ) Notice: Subject to any disclaimer, the term of this patent is extended or adjusted under 35 U.S.C. 154(b) by 0 days.

(21) Appl. No.: 13/080,940

(22) Filed: Apr. 6, 2011

(65) Prior Publication Data

US 2011/0189488 A1     Aug. 4, 2011

Related U.S. Application Data

(63) Continuation of application No. 11/667,093, filed as application No. PCT/EP2005/011954 on Nov. 9, 2005, now abandoned.

(30) Foreign Application Priority Data

Apr. 4, 2005  (DE) .......... 10 2005 015 573
Apr. 4, 2005  (DE) .......... 10 2005 015 575
Apr. 4, 2005  (DE) .......... 10 2005 015 576

(51) Int. Cl.
  B05D 3/10   (2006.01)
  C08K 3/16   (2006.01)
  C08L 63/00  (2006.01)

(52) U.S. Cl.
  USPC .......... 428/418; 428/447; 427/352; 524/300; 523/425

(58) Field of Classification Search
  None
  See application file for complete search history.

(56) References Cited

U.S. PATENT DOCUMENTS

| | | |
|---|---|---|
| 4,063,016 A | 12/1977 | Austin |
| 4,112,151 A | 9/1978 | Cooke |
| 4,311,738 A | 1/1982 | Chi |
| 4,452,918 A | 6/1984 | Uchida et al. |
| 4,457,790 A | 7/1984 | Lindert et al. |
| 4,617,056 A | 10/1986 | Mosser et al. |
| 4,659,394 A | 4/1987 | Hara et al. |
| 4,959,180 A | 9/1990 | Armes et al. |
| 4,986,886 A | 1/1991 | Wei et al. |
| 5,053,081 A | 10/1991 | Jacob |
| 5,108,793 A | 4/1992 | van Ooij et al. |
| 5,174,867 A | 12/1992 | Naarmann et al. |
| 5,246,507 A * | 9/1993 | Kodama et al. ............ 148/250 |
| 5,324,545 A | 6/1994 | Flamme |
| 5,415,893 A | 5/1995 | Wiersma et al. |
| 5,451,431 A | 9/1995 | Purnell et al. |
| 5,482,655 A | 1/1996 | Vogel et al. |
| 5,531,820 A | 7/1996 | Gorecki |
| 5,593,731 A | 1/1997 | Akagi et al. |
| 5,700,523 A | 12/1997 | Petrole et al. |
| 5,868,820 A | 2/1999 | Claffey |
| 5,885,711 A | 3/1999 | Clarisse et al. |
| 5,905,109 A | 5/1999 | Shimizu et al. |
| 5,968,417 A | 10/1999 | Viswanathan |
| 6,051,670 A | 4/2000 | Ahmed et al. |
| 6,054,514 A | 4/2000 | Kulkarni |
| 6,068,711 A | 5/2000 | Lu et al. |
| 6,132,645 A | 10/2000 | Hedges |
| 6,180,177 B1 | 1/2001 | Nagashima et al. |
| 6,203,854 B1 | 3/2001 | Affinito |
| 6,319,351 B1 | 11/2001 | Dixon |
| 6,328,874 B1 | 12/2001 | Kinlen et al. |
| 6,458,219 B2 | 10/2002 | Chihara et al. |
| 6,478,886 B1 | 11/2002 | Kunz et al. |
| 6,482,274 B2 | 11/2002 | Shimakura et al. |
| 6,514,357 B2 | 2/2003 | Tada et al. |
| 6,572,983 B2 | 6/2003 | Shimakura et al. |
| 6,589,324 B2 | 7/2003 | Kamo et al. |
| 6,596,835 B1 | 7/2003 | Brown et al. |
| 6,623,791 B2 | 9/2003 | Sadvary et al. |
| 6,649,273 B2 | 11/2003 | Iwato et al. |
| 6,794,046 B1 | 9/2004 | Kurze et al. |
| 6,805,756 B2 | 10/2004 | Claffey et al. |
| 6,875,478 B2 | 4/2005 | Yoshikawa et al. |
| 6,875,479 B2 | 4/2005 | Jung et al. |

(Continued)

FOREIGN PATENT DOCUMENTS

| | | |
|---|---|---|
| CA | 1211406 | 9/1986 |
| CN | 1195025 C | 3/2005 |

(Continued)

OTHER PUBLICATIONS

Definition of "siloxane" from Alger, Mark, Ed., "Polymer Science Dictionary, $2^{nd}$ Ed." Copyright 1989 Chapman & Hall, 1997 Mark Alger, p. 522.

(Continued)

*Primary Examiner* — Yun Qian

(74) *Attorney, Agent, or Firm* — Fulbright & Jaworski LLP

(57) ABSTRACT

A composition and a method for coating metallic surfaces with a silane/silanol/siloxane/polysiloxane-containing composition, whereby the composition contains a) at least one compound selected from the silanes, silanols, siloxanes and polysiloxanes, b) at least two compounds selected from titanium-, hafnium-, zirconium-, aluminum- or boron-containing compounds, optionally c) at least one type of cation selected from cations of metals of the $1^{st}$ to $3^{rd}$ and $5^{th}$ to $8^{th}$ sub-groups including the lanthanides and the $2^{nd}$ main group of the periodic table of the elements or at least one corresponding compound, d) at least one organic compound selected from monomers, oligomers, polymers, copolymers and block copolymers or e) at least one substance affecting the pH value, water and optionally at least one organic solvent.

11 Claims, No Drawings

(56) References Cited

U.S. PATENT DOCUMENTS

| | | |
|---|---|---|
| 6,875,514 B2 | 4/2005 | Sormani et al. |
| 6,942,899 B2 | 9/2005 | Kendig et al. |
| 7,033,673 B2 | 4/2006 | Wiedemann et al. |
| 7,344,607 B2 | 3/2008 | Melzer et al. |
| 7,452,428 B2 | 11/2008 | Koch et al. |
| 7,510,612 B2 | 3/2009 | Matsukawa et al. |
| 8,101,232 B2 | 1/2012 | Eriksson et al. |
| 2001/0012078 A1 | 8/2001 | Hira et al. |
| 2001/0031416 A1 | 10/2001 | Everaars et al. |
| 2001/0031811 A1 | 10/2001 | Li et al. |
| 2002/0091195 A1 | 7/2002 | Paar et al. |
| 2003/0185990 A1 | 10/2003 | Bittner et al. |
| 2004/0022950 A1 | 2/2004 | Jung et al. |
| 2004/0022951 A1 | 2/2004 | Maurus |
| 2004/0029395 A1 | 2/2004 | Zhang et al. |
| 2004/0054044 A1 | 3/2004 | Bittner et al. |
| 2004/0062873 A1 | 4/2004 | Jung et al. |
| 2004/0065389 A1 | 4/2004 | Kolberg et al. |
| 2004/0129346 A1 | 7/2004 | Kolberg et al. |
| 2004/0149961 A1 | 8/2004 | Konuma et al. |
| 2004/0149963 A1 | 8/2004 | Sinko et al. |
| 2004/0167266 A1 | 8/2004 | Hasegawa et al. |
| 2004/0168748 A1 | 9/2004 | Hartwig et al. |
| 2004/0170840 A1* | 9/2004 | Matsukawa et al. ....... 428/422.8 |
| 2005/0037208 A1 | 2/2005 | Ogino et al. |
| 2006/0093755 A1 | 5/2006 | Bittner et al. |
| 2006/0099429 A1 | 5/2006 | Domes et al. |
| 2006/0127681 A1 | 6/2006 | Domes et al. |
| 2007/0298174 A1 | 12/2007 | Kolberg et al. |
| 2008/0127859 A1 | 6/2008 | Kolberg et al. |
| 2008/0138615 A1 | 6/2008 | Kolberg et al. |
| 2008/0171211 A1 | 7/2008 | Plieth et al. |
| 2008/0175992 A1 | 7/2008 | Plieth et al. |
| 2008/0286470 A1 | 11/2008 | Matsukawa et al. |
| 2008/0305341 A1 | 12/2008 | Plieth et al. |
| 2010/0038250 A1 | 2/2010 | Matsukawa et al. |
| 2011/0039115 A1 | 2/2011 | Domes et al. |

FOREIGN PATENT DOCUMENTS

| | | |
|---|---|---|
| DE | 31 51 115 | 9/1982 |
| DE | 41 38 218 | 5/1993 |
| DE | 43 34 628 | 1/1995 |
| DE | 198 14 605 A1 | 10/1999 |
| DE | 100 16 181 A1 | 11/2000 |
| DE | 199 19 261 A1 | 11/2000 |
| DE | 199 56 383 A1 | 5/2001 |
| DE | 101 49 148 A | 5/2002 |
| DE | 10 308 237 A1 | 9/2004 |
| EP | 0 153 973 A1 | 9/1985 |
| EP | 0 492 306 A2 | 7/1992 |
| EP | 0 687 715 A2 | 12/1994 |
| EP | 0 676 420 B1 | 10/1995 |
| EP | 0 824 127 A2 | 2/1998 |
| EP | 0 949 353 A1 | 10/1999 |
| EP | 0 952 193 A1 | 10/1999 |
| EP | 1 130 132 A2 | 9/2001 |
| EP | 1 130 133 A2 | 9/2001 |
| EP | 1 146 144 A11 | 10/2001 |
| EP | 1 382 721 A | 1/2004 |
| EP | 1 426 466 A1 | 6/2004 |
| EP | 1 433 875 A1 | 6/2004 |
| EP | 1 433 876 A1 | 6/2004 |
| EP | 1 433 877 A1 | 6/2004 |
| EP | 1 433 878 A1 | 6/2004 |
| EP | 1 051 478 B1 | 11/2004 |
| EP | 1 812 620 B1 | 8/2007 |
| EP | 1 398 564 B1 | 2/2009 |
| GB | 1 528 715 | 10/1978 |
| JP | 52-117930 | 10/1977 |
| JP | 52-135340 | 11/1977 |
| JP | 11-106945 | 4/1999 |
| JP | 2001-192852 | 7/2001 |
| JP | 2001-311037 | 11/2001 |
| JP | 2001-329379 | 11/2001 |
| JP | 2004-218070 | 8/2004 |
| JP | 2004-218075 | 8/2004 |
| JP | 2004-527654 A | 9/2004 |
| JP | 2005-008982 | 1/2005 |
| TW | 408194 B | 10/2000 |
| WO | WO 93/14166 A | 7/1993 |
| WO | WO 94/11885 A | 5/1994 |
| WO | WO 96/17109 A1 | 6/1996 |
| WO | WO 97/34137 | 9/1997 |
| WO | WO 00/46310 A1 | 8/2000 |
| WO | WO 01/36605 A2 | 5/2001 |
| WO | WO 01/90267 A2 | 11/2001 |
| WO | WO 02/070782 | 2/2002 |
| WO | WO 02/24344 A2 | 3/2002 |
| WO | WO 02/31062 A2 | 4/2002 |
| WO | WO 02/31063 A2 | 4/2002 |
| WO | WO 02/31065 A2 | 4/2002 |
| WO | WO 02/031222 | 4/2002 |
| WO | WO 02/070781 A2 | 9/2002 |
| WO | WO 03/027203 A | 4/2003 |
| WO | WO 03/035280 A2 | 5/2003 |
| WO | WO 03/083171 A1 | 10/2003 |
| WO | WO 03/102034 A1 | 12/2003 |
| WO | WO 2004/055238 A1 | 7/2004 |
| WO | WO 2004/076568 | 9/2004 |
| WO | WO 2004/076717 A1 | 9/2004 |
| WO | WO 2004/076718 A1 | 9/2004 |
| WO | WO 2004/101693 A1 | 11/2004 |
| WO | WO 2006/050917 A2 | 5/2006 |

OTHER PUBLICATIONS

Assaf "Inhibiting Effects of Group 6 Oxo-Anions on the Pitting Corrosion of Tin in Citrate-Chloride Solution", *Bull. Chem. Soc. Jpn.*,73 (2000), pp. 561-568.

De Souza, et al.: "Poiyaniline based acrylic blends for iron corrosion protection", *Electochem. and Solid State Letters* 4 (8) (2001) B27-B30.

Duc "The Role of Anions in Corrosion Protection of Iron and Zinc by Polypyrrole", PhD Dissertation, Dresden, German (Sep. 4, 2005).

"Chapter: Pyrrole and Pyrrole Derivatives", Kirk-Othmer Encyclopedia of Chemical Technology, Wiley (2000), p. 2.

Harper,e t al. "Paltics Materials and Processes: A Cibcuse Encyclopedia", Wiley (2003), pp. 95-96.

Kupila, et al. "Redox processes in thick films of polypyrrole/dodecylsulfate in the presence of alkali and tetramethylammonium chlorides", *Synthetic Metals*, 74 (1995) pp. 207-215.

Newman et al., Electrochern. Systems, Wiley (2004).

Ruckenstein, et al.: "An emulsion pathway to electrically conductive polyaniline-polystyrene composites", *Synthetic Metals*, 53 (1993) pp. 282-292.

Szycher, Szycher's Handbook of Polyurethanes, CRC Press (1999).

Tallman, of al.: "Electroactive conducting polymers for corrosion control", *J. Solid State Electrochem*. (2002) 6 pp. 73-84.

Totten, of al. "Handbook of Aluminum", vol. 2 CRC Press (2003), p. 476.

Wiersma, et al. "Waterborne core-shell dispersions based on intrinsically conducting polymers for coating applications", *Synthetic Metals* 71 (1995), pp. 2269-2270.

Yang et al.: "Processable conductive composites of polyaniline/poly(alkyl methacryalte) prepared via an emulsion ethod", *Synthetic Metals* 59 (1993) pp. 1-12.

Yui, et al.: "Reflexive Polymers and Hydrogels: Understanding and Designing Fast Reponsive Polymeric Systems", CRC (2004).

Pal, Rheology of Particulate Dispersions and Composites, CRC Press (2006), p. 8.

Njuguna, et al. "Recent Developments in polyurethane-based conducting composites", *J. Material Sci*. 39 (2004) pp. 4081-4094.

* cited by examiner

PROCESS FOR COATING METALLIC SURFACES WITH AN AQUEOUS COMPOSITION, AND THIS COMPOSITION

This application is a continuation application of U.S. Ser. No. 11/667,093 filed Aug. 1, 2007 now abandoned, hereby incorporated by reference in its entirety, which is a §371 of PCT/EP2005/011954 filed Nov. 9, 2005, and claims priority from U.S. Ser. No. 10/985,652 filed Nov. 10, 2004, German Patent Application No. 10 2005 015 573.1 filed Apr. 4, 2005, German Patent Application No. 10 2005 015 576.6 filed Apr. 4, 2005 and German Patent Application No. 10 2005 015 575.8 filed Apr. 4, 2005.

The invention relates to a process for coating metallic surfaces with an aqueous composition containing at least one silane and/or related compound and at least two other components. The invention further relates to corresponding aqueous compositions and to the use of the substrates coated by the process according to the invention.

The processes most commonly employed hitherto for the treatment of metallic surfaces, especially parts, coil or coil portions made of at least one metallic material, or for the pretreatment of metallic surfaces prior to lacquering are frequently based on the one hand on the use of chromium(VI) compounds, optionally together with diverse additives, or on the other hand on phosphates, e.g. zinc/manganese/nickel phosphates, optionally together with diverse additives.

Because of the toxicological and ecological risks associated especially with processes using chromate or nickel, alternatives to these processes in all the areas of surface technology for metallic substrates have been sought for many years, but it has repeatedly been found that, in many applications, completely chromate-free or nickel-free processes do not satisfy 100% of the performance spectrum or do not offer the desired safety. Attempts are therefore being made to minimize the chromate contents or nickel contents and to replace $Cr^{6+}$ with $Cr^{3+}$ as far as possible. High-quality phosphatizing processes are used especially in the automobile industry, e.g. for the pretreatment of car bodies prior to lacquering, which have maintained the quality of automobile corrosion protection at a high level. Zinc/manganese/nickel phosphatizing processes are conventionally employed for this purpose. Despite many years of research and development, attempts to phosphatize nickel-free without pronounced quality limitations have proved unsuccessful for multimetal applications such as those often involved in car bodies, where, in Europe, metallic surfaces of steel, galvanized steel and aluminium or aluminium alloys are typically pretreated in the same bath. However, since nickel contents, even if comparatively small, are now classified as being of greater toxicological concern for the foreseeable future, the question arises as to whether an equivalent corrosion protection can be achieved with other chemical processes.

The use e.g. of silanes/silanols in aqueous compositions for the production of siloxane/polysiloxane-rich anticorrosive coatings is known in principle. For the sake of simplicity, silane/silanol/siloxane/polysiloxane will hereafter often be referred to only as silane. These coatings have proved themselves, but some processes for coating with an aqueous composition containing predominantly silane, in addition to solvent(s), are difficult to apply. These coatings are not always formed with outstanding properties. Moreover, adequate characterization, with the naked eye or optical aids, of the very thin, transparent silane coatings on the metallic substrate, and their defects, can be problematic. The corrosion protection and the lacquer adhesion of the siloxane- and/or polysiloxane-rich coatings formed are often high, but not always; in some cases, even with appropriate application, they are insufficiently high for particular uses. There is a need for other processes, using at least one silane, which offer a high process safety and a high quality of the coatings produced, especially in respect of corrosion resistance and lacquer adhesion.

In the formulation of silane-containing aqueous compositions, it has also proved beneficial to add a small or large amount of at least one component selected from the group comprising organic monomers, oligomers and polymers. The type and amount of silane added to such compositions is in some cases of decisive importance for the outcome. Conventionally, however, the amounts of silane added are comparatively small—usually only up to 5 wt. % of the total solids content—and they then function as a coupling agent, where the adhesion-promoting action should prevail especially between metallic substrate and lacquer and optionally between pigment and organic lacquer constituents, but a slight crosslinking action can also occur in some cases as a secondary effect. Chiefly, very small amounts of silane are added to thermosetting resin systems.

The other two patent applications on a similar subject matter submitted to the same patent office on the same date are expressly included here, especially in respect of the aqueous compositions, the additions to the aqueous compositions, the steps before, during and after coating, the bath behaviour, the layer formation, the layer properties and the effects determined, particularly in the Examples and Comparative Examples. Likewise, the patent applications that give rise to a right of priority are also expressly included in the subsequent patent applications.

It is known from EP 1 017 880 B1 to use an aqueous composition containing a partially hydrolysed aminosilane and a fluorine-containing acid in a mixing ratio of 1:2 to 2:1. This acid is preferably fluorotitanic acid. The coatings produced therewith are good but do not satisfy the prerequisites for high-quality corrosion-resistant coatings in the same way as the extremely high-quality phosphate coatings based on zinc/manganese/nickel phosphate used in automobile construction, especially for multimetal applications. The publication gives no indication that a combination of several acids can be advantageous.

The object was therefore to propose aqueous compositions whose coatings have an environmentally friendly chemical composition and assure a high corrosion resistance, and which are also suitable in multimetal applications in which e.g. steel and zinc-rich metallic surfaces, and optionally also aluminium-rich metallic surfaces, are treated or pretreated in the same bath. The object was also to propose aqueous compositions that are suitable for coating car bodies in automobile construction.

It has now been found that a combination of at least two complex fluorides, especially fluorotitanic acid and fluorozirconic acid, affords an exceptional increase in quality of the coating.

It has now been found not only that it is possible to rinse freshly applied silane-based coatings that have not yet dried thoroughly and hence not yet condensed more substantially, but also that this process sequence is even advantageous, because the coatings produced and rinsed in this way even have better corrosion protection and better lacquer adhesion, to some extent independently of the chemical composition of the aqueous bath. This contradicts earlier experiences where the rinsing of a freshly applied silane-based coating that has not yet dried more substantially easily and frequently leads to an impairment of the quality of the layer, or even to the removal of part or, occasionally, all of the coating.

It has now also been found that it is possible and advantageous to apply a lacquer, a lacquer-like coating, a primer or an adhesive to freshly applied silane-based coatings that have not yet dried thoroughly and hence not yet condensed more substantially, which may also have been rinsed in this state. The application of such compositions to silane-based wet films is advantageous because the coatings produced and rinsed in this way even have better corrosion protection and better lacquer adhesion, to some extent independently of the chemical composition of the aqueous bath.

The object is achieved by a process for coating metallic surfaces with a composition containing silane/silanol/siloxane/polysiloxane, the composition consisting essentially of a) at least one compound selected from silanes, silanols, siloxanes and polysiloxanes, b) at least two compounds selected from compounds containing titanium, hafnium, zirconium, aluminium and/or boron, and optionally c) at least one type of cation selected from cations of metals of subgroups 1 to 3 and 5 to 8, including lanthanides, and of main group 2 of the periodic table of the elements, and/or at least one corresponding compound, d) at least one organic compound selected from monomers, oligomers, polymers, copolymers and block copolymers, and/or e) at least one substance that influences the pH, as well as f) water, and g) optionally at least one organic solvent.

The object is also achieved with an aqueous composition for coating metallic surfaces which consists essentially of a) at least one compound selected from silanes, silanols, siloxanes and polysiloxanes, and b) at least two compounds containing titanium, hafnium, zirconium, aluminium and/or boron, and optionally c) at least one type of cation selected from cations of metals of subgroups 1 to 3 and 5 to 8, including lanthanides, and of main group 2 of the periodic table of the elements, and/or at least one corresponding compound, d) at least one organic compound selected from monomers, oligomers, polymers, copolymers and block copolymers, and/or e) at least one substance that influences the pH, as well as f) water, and g) optionally at least one organic solvent.

The content of the patent application that gives rise to a right of priority to the present patent application, DE 102005015575.8, the content of the other, related patent applications that give rise to a right of priority, DE 102005015573.1, DE 102005015576.6 and U.S. Ser. No. 10/985,652, and the content of the parallel PCT applications issuing from the three last-mentioned patent applications that give rise to a right of priority, is to be expressly included in the present patent application, especially in respect of the different compositions, different compounds added, different process steps, different coatings produced, Examples, Comparative Examples and effects, properties and laboratory results mentioned therein.

The word "silane" is used here for silanes, silanols, siloxanes, polysiloxanes and their reaction products or derivatives, which often are also "silane" mixtures. In terms of the present patent application, the word "condensation" denotes all forms of crosslinking, further crosslinking and further chemical reactions of the silanes/silanols/siloxanes/polysiloxanes. In terms of the present patent application, the word "coating" refers to the coating formed with the aqueous composition, including the wet film, the dried-on film, the thoroughly dried film, the film dried at elevated temperature and the film optionally crosslinked further by heating and/or irradiation.

In terms of the present patent application, the expression "consists essentially of . . ." is understood as meaning that the aqueous composition according to the invention can optionally comprise up to 15 wt. %, based on the content of solids and active ingredients of substances a) to d) and f), of other substances that can help to improve the very wide variety of properties of the aqueous composition and/or the coating, and/or to adapt them to requirements. These substances can include especially additives such as biocide(s) and/or defoamers and/or at least one substance selected from silicon-free compounds having at least one amino, urea and/or ureido group, hydroxide(s), carboxylate(s), nitrate (s) and phosphorus-containing and oxygen-containing compounds, e.g. phosphate(s). This expression preferably comprises, within the up to 15 wt. % of the content of solids and active ingredients of substances a) to d) and f), other substances that essentially are only hydroxide(s), acetate(s) and nitrate(s). Particularly preferably, the content of the other substances is up to 12, up to 10, up to 8, up to 6, up to 4 or up to 2 wt. % of the content of solids and active ingredients of substances a) to d) and f).

The aqueous composition is an aqueous solution, an aqueous dispersion and/or an emulsion. The pH of the aqueous composition is preferably greater than 1.5 and less than 9, particularly preferably in the range from 2 to 7, very particularly preferably in the range from 2.5 to 6.5 and especially in the range from 3 to 6.

Particularly preferably, at least one silane and/or at least one corresponding compound having at least one amino group, urea group and/or ureido group (imino group) is added to the aqueous composition because the coatings produced therewith often exhibit a greater lacquer adhesion and/or a higher affinity for the subsequent lacquer layer. In particular, when using at least one silane and/or at least one corresponding compound having at least one such group, it should be pointed out that condensation may proceed very rapidly at pH values below 2. The proportion of aminosilanes, ureidosilanes and/or silanes having at least one ureido group, and/or of corresponding silanols, siloxanes and polysiloxanes, relative to the sum of all types of compounds selected from silanes, silanols, siloxanes and polysiloxanes, can preferably be high, particularly preferably above 20, above 30 or above 40 wt. %, calculated as the corresponding silanols, very particularly preferably above 50, above 60, above 70 or above 80 wt. % and possibly even up to 90, up to 95 or up to 100 wt. %.

Preferably, the aqueous composition has a content of silane/silanol/siloxane/polysiloxane a) ranging from 0.005 to 80 g/l, calculated on the basis of the corresponding silanols. This content is particularly preferably in the range from 0.01 to 30 g/l, very particularly preferably in the range from 0.02 to 12 g/l, to 8 g/l or to 5 g/l and especially in the range from 0.05 to 3 g/l or in the range from 0.08 to 2 g/l or to 1 g/l. These ranges of contents refer particularly to bath compositions.

However, if a concentrate is used to prepare a corresponding bath composition, especially by dilution with water and optionally by the addition of at least one other substance, it is advisable, for example, to keep a concentrate A containing silane/silanol/siloxane/polysiloxane a) separate from a concentrate B containing all or almost all of the remaining constituents, and only to bring these components together in the bath. This optionally also makes it possible for at least one silane, silanol, siloxane and/or polysiloxane to be partially or completely in the solid state, to be added in the solid state and/or to be added as a dispersion or solution. The content of silane/silanol/siloxane/polysiloxane a) in concentrate A preferably ranges from 0.01 to 1000 g/l, calculated on the basis of the corresponding silanols. This content ranges particularly preferably from 0.02 to 200 g/l, very particularly preferably from 0.05 to 120 g/l and especially from 0.1 to 60 g/l. However, the main emphases of the contents in the concentration ranges of concentrate A or the bath can vary with the application.

Particularly preferably, the composition contains at least one silane, silanol, siloxane and/or polysiloxane a) having in each case at least one group selected from acrylate groups, alkylaminoalkyl groups, alkylamino groups, amino groups, aminoalkyl groups, succinic anhydride groups, carboxyl groups, epoxy groups, glycidoxy groups, hydroxyl groups, urea groups, isocyanato groups, methacrylate groups and/or ureido groups (imino groups).

The silanes, silanols, siloxanes and/or polysiloxanes in the aqueous composition, or at least their compounds added to the aqueous composition, or at least some of these, are preferably water-soluble. In terms of the present patent application, the silanes are regarded as water-soluble if together they have a solubility in water of at least 0.05 g/l, preferably of at least 0.1 g/l and particularly preferably of at least 0.2 g/l or at least 0.3 g/l at room temperature in the composition containing silane/silanol/siloxane/polysiloxane. This does not mean that each individual silane must have this minimum solubility, but that these minimum values are achieved on average.

The aqueous composition preferably contains at least one silane/silanol/siloxane/polysiloxane selected from fluorine-free silanes and the corresponding silanols/siloxanes/polysiloxanes, consisting respectively of at least one acyloxysilane, alkoxysilane, silane having at least one amino group, such as an aminoalkylsilane, silane having at least one succinic acid group and/or succinic anhydride group, bis(silyl)silane, silane having at least one epoxy group, such as a glycidoxysilane, (meth)acrylatosilane, poly(silyl)silane, ureidosilane or vinylsilane, and/or at least one silanol and/or at least one siloxane or polysiloxane whose chemical composition corresponds to that of the silanes mentioned above. It contains at least one silane and/or (in each case) at least one monomeric, dimeric, oligomeric and/or polymeric silanol and/or (in each case) at least one monomeric, dimeric, oligomeric and/or polymeric siloxane, oligomers being understood hereafter to include dimers and trimers. Particularly preferably, the at least one silane or the corresponding silanol/siloxane/polysiloxane has in each case at least one amino group, urea group and/or ureido group.

In particular, this composition contains at least one silane and/or at least one corresponding silanol/siloxane/polysiloxane selected from the following group or based thereon:
(3,4-epoxyalkyl)trialkoxysilane,
(3,4-epoxycycloalkyl)alkyltrialkoxysilane,
3-acryloxyalkyltrialkoxysilane,
3-glycidoxyalkyltrialkoxysilane,
3-methacryloxyalkyltrialkoxysilane,
3-(trialkoxysilyl)alkylsuccinosilane,
4-aminodialkylalkyltrialkoxysilane,
4-aminodialkylalkylalkyldialkoxysilane,
aminoalkylaminoalkyltrialkoxysilane,
aminoalkylaminoalkylalkyldialkoxysilane,
aminoalkyltrialkoxysilane,
bis(trialkoxysilylalkyl)amine,
bis(trialkoxysilyl)ethane,
gamma-acryloxyalkyltrialkoxysilane,
gamma-aminoalkyltrialkoxysilane,
gamma-methacryloxyalkyltrialkoxysilane,
(gamma-trialkoxysilylalkyl)dialkylenetriamine,
gamma-ureidoalkyltrialkoxysilane,
N-2-aminoalkyl-3-aminopropyltrialkoxysilane,
N-(3-trialkoxysilylalkyl)alkylenediamine,
N-alkylaminoisoalkyltrialkoxysilane,
N-(aminoalkyl)aminoalkylalkyldialkoxysilane,
N-beta-(aminoalkyl)-gamma-aminoalkyltrialkoxysilane,
N-(gamma-trialkoxysilylalkyl)dialkylenetriamine,
N-phenylaminoalkyltrialkoxysilane,
poly(aminoalkyl)alkyldialkoxysilane,
tris(3-trialkoxysilyl)alkylisocyanurate,
ureidoalkyltrialkoxysilane and
vinylacetoxysilane.

Particularly preferably, this composition contains at least one silane and/or at least one corresponding silanol/siloxane/polysiloxane selected from the following group or based thereon:
(3,4-epoxybutyl)triethoxysilane,
(3,4-epoxybutyl)trimethoxysilane,
(3,4-epoxycyclohexyl)propyltriethoxysilane,
(3,4-epoxycyclohexyl)propyltrimethoxysilane,
3-acryloxypropyltriethoxysilane,
3-acryloxypropyltrimethoxysilane,
3-glycidoxypropyltriethoxysilane,
3-glycidoxypropyltrimethoxysilane,
3-methacryloxypropyltriethoxysilane,
3-methacryloxypropyltrimethoxysilane,
3-(triethoxysilyl)propylsuccinosilane,
aminoethylaminopropylmethyldiethoxysilane,
aminoethylaminopropylmethyldimethoxysilane,
aminopropyltrialkoxysilane,
beta-(3,4-epoxycyclohexyl)ethyltriethoxysilane,
beta-(3,4-epoxycyclohexyl)ethyltrimethoxysilane,
beta-(3,4-epoxycyclohexyl)methyltriethoxysilane,
beta-(3,4-epoxycyclohexyl)methyltrimethoxysilane,
bis-1,2-(triethoxysilyl)ethane,
bis-1,2-(trimethoxysilyl)ethane,
bis(triethoxysilylpropyl)amine,
bis(trimethoxysilylpropyl)amine,
gamma-(3,4-epoxycyclohexyl)propyltriethoxysilane,
gamma-(3,4-epoxycyclohexyl)propyltrimethoxysilane,
gamma-acryloxypropyltriethoxysilane,
gamma-acryloxypropyltrimethoxysilane,
gamma-aminopropyltriethoxysilane,
gamma-aminopropyltrimethoxysilane,
gamma-methacryloxypropyltriethoxysilane,
gamma-methacryloxypropyltrimethoxysilane,
gamma-ureidopropyltrialkoxysilane,
N-2-aminoethyl-3-aminopropyltriethoxysilane,
N-2-aminoethyl-3-aminopropyltrimethoxysilane,
N-2-aminomethyl-3-aminopropyltriethoxysilane,
N-2-aminomethyl-3-aminopropyltrimethoxysilane,
N-(3-(trimethoxysilyl)propyl)ethylenediamine,
N-beta-(aminoethyl)-gamma-aminopropyltriethoxysilane,
N-beta-(aminoethyl)-gamma-aminopropyltrimethoxysilane,
N-(gamma-triethoxysilylpropyl)diethylenetriamine,
N-(gamma-trimethoxysilylpropyl)diethylenetriamine,
N-(gamma-triethoxysilylpropyl)dimethylenetriamine,
N-(gamma-trimethoxysilylpropyl)dimethylenetriamine,
poly(aminoalkyl)ethyldialkoxysilane,
poly(aminoalkyl)methyldialkoxysilane,
tris(3-(triethoxysilyl)propyl)isocyanurate,
tris(3-(trimethoxysilyl)propyl)isocyanurate,
ureidopropyltrialkoxysilane and
vinyltriacetoxysilane.

Optionally, in specific embodiments, the aqueous composition contains at least one silane/silanol/siloxane/polysiloxane having a fluorine-containing group. By choosing the silane compound(s) it is also possible to adjust the hydrophilicity/hydrophobicity according to the desired objective.

Preferably, in some embodiments of the aqueous composition, at least one at least partially hydrolysed and/or at least partially condensed silane/silanol/siloxane/polysiloxane is added. In particular, when mixing the aqueous composition, it is optionally possible to add at least one already prehydrolysed, precondensed silane/silanol/siloxane/polysiloxane. Such an addition is particularly preferred.

In some embodiments, at least one at least extensively and/or completely hydrolysed and/or at least extensively and/or completely condensed silane/silanol/siloxane/polysiloxane can be added to the aqueous composition. In many embodiments, a non-hydrolysed silane bonds to the metallic surface less well than an at least partially hydrolysed silane/silanol. In many embodiments, an extensively hydrolysed and uncondensed or only slightly condensed silane/silanol/siloxane bonds to the metallic surface markedly better than an at least partially hydrolysed and extensively condensed silane/silanol/siloxane/polysiloxane. In many embodiments, a completely hydrolysed and extensively condensed silanol/siloxane/polysiloxane exhibits only a slight tendency to become chemically bonded to the metallic surface.

In some embodiments, at least one siloxane and/or polysiloxane containing little or no silanes/silanols—e.g. less than 20 or less than 40 wt. % of the sum of silane/silanol/siloxane/polysiloxane—can be added to the aqueous composition in addition and/or as an alternative to silane(s)/silanol(s). The siloxane or polysiloxane is preferably short-chain and is preferably applied by means of a rollcoater treatment. This then optionally affects the coating by strengthening the hydrophobicity and increasing the blank corrosion protection.

Preferably, the aqueous composition contains at least two or even at least three titanium, hafnium, zirconium, aluminium and boron compounds, it being possible for these compounds to differ in their cations and/or anions. The aqueous composition, especially the bath composition, preferably contains at least one complex fluoride b) and particularly preferably at least two complex fluorides selected from complex fluorides of titanium, hafnium, zirconium, aluminium and boron. Preferably, their difference lies not only in the type of complex. The aqueous composition, especially the bath composition, preferably has a content of compounds b), selected from titanium, hafnium, zirconium, aluminium and boron compounds, ranging from 0.01 to 50 g/l, calculated as the sum of the corresponding metals. This content ranges particularly preferably from 0.1 to 30 g/l, very particularly preferably from 0.3 to 15 g/l and especially from 0.5 to 5 g/l. On the other hand, the content of titanium, hafnium, zirconium, aluminium and boron compounds in the concentrate, for example in concentrate B free of silane/silanol/siloxane/polysiloxane, can preferably range from 1 to 300 g/l, calculated as the sum of the corresponding metals. This content ranges particularly preferably from 2 to 250 g/l, very particularly preferably from 3 to 200 g/l and especially from 5 to 150 g/l. The composition preferably contains no aluminium phosphate, no titanium sulfate, no zirconium nitrate and/or no zirconium chloride.

Preferably, the composition contains at least one complex fluoride, the content of complex fluoride (s) ranging especially from 0.01 to 100 g/l, calculated as the sum of the corresponding metal complex fluorides as $MeF_6$. This content ranges preferably from 0.03 to 70 g/l, particularly preferably from 0.06 to 40 g/l and very particularly preferably from 1 to 10 g/l. The complex fluoride can be present especially as $MeF_4$ and/or $MeF_6$, but also in other states or intermediate states. Advantageously, at least one titanium complex fluoride and at least one zirconium complex fluoride are simultaneously present in many embodiments. It can be advantageous in many cases here to have at least one $MeF_4$ complex and at least one $MeF_6$ complex present in the composition simultaneously, especially a $TiF_6$ complex and a $ZrF_4$ complex. It can be advantageous here to adjust these proportions of complex fluorides in the concentrate and transfer them to the bath in this way. On the other hand, the content of these compounds in the concentrate, for example in concentrate B free of silane/silanol/siloxane/polysiloxane, can preferably range from 0.05 to 500 g/l, calculated as the sum of $MeF_6$. This content ranges particularly preferably from 0.05 to 300 g/l, very particularly preferably from 0.05 to 150 g/l and especially from 0.05 to 50 g/l.

Surprisingly, the individual complex fluorides do not adversely affect one another when combined, but exhibit an unexpected positive reinforcing effect. These additions based on complex fluoride obviously act in a similar or identical manner. Surprisingly, if a combination of complex fluorides based on titanium and zirconium is used rather than a complex fluoride based only on titanium or only on zirconium, the results obtained are always noticeably better than in the case of only one of these additions. A complex fluoride based on titanium or zirconium probably deposits on the surface as oxide and/or hydroxide.

It has now been established, surprisingly, that a good multimetal treatment with a single aqueous composition is only possible if a complex fluoride has been used, and that a very good multimetal treatment with a single aqueous composition is only possible if at least two different complex fluorides are used, e.g. those based on titanium and zirconium. In a very wide variety of experiments, the complex fluorides used individually never gave results equivalent to those for the combination of these two complex fluorides, independently of what other additions were made.

As an alternative or in addition to at least one complex fluoride, it is also possible to add another type of titanium, hafnium, zirconium, aluminium and/or boron compound, for example at least one hydroxycarbonate and/or at least one other water-soluble or sparingly water-soluble compound, e.g. at least one nitrate and/or at least one carboxylate.

It has now been shown, however, that an addition of silicon hexafluoride as the only complex fluoride added to an aqueous composition has a different and sometimes markedly poorer effect than the additions of other complex fluorides.

Preferably, only types of cation, or corresponding compounds, from the group comprising magnesium, calcium, yttrium, lanthanum, cerium, vanadium, niobium, tantalum, molybdenum, tungsten, manganese, iron, cobalt, nickel, copper, silver and zinc, and particularly preferably from the group comprising magnesium, calcium, yttrium, lanthanum, cerium, vanadium, molybdenum, tungsten, manganese, iron, cobalt, copper and zinc, are selected as cations and/or corresponding compounds c), trace contents being excepted.

On the other hand, it has been shown, surprisingly, that iron and zinc cations, and therefore also the presence in the bath of corresponding compounds which can make an increased contribution, in the particular case of acidic compositions, to dissolving such ions out of the metallic surface, do not have an adverse effect, over wide ranges of contents, on the bath behaviour, the layer formation or the layer properties.

Preferably, the aqueous composition, especially the bath composition, has a content of cations and/or corresponding compounds c) ranging from 0.01 to 20 g/l, calculated as the sum of the metals. This content ranges particularly preferably from 0.03 to 15 g/l, very particularly preferably from 0.06 to 10 g/l and especially from 0.1 to 6 g/l. On the other hand, the content of these compounds in the concentrate, for example in concentrate B free of silane/silanol/siloxane/polysiloxane, can preferably range from 1 to 240 g/l, calculated as the sum of the metals. This content ranges particularly preferably from 2 to 180 g/l, very particularly preferably from 3 to 140 g/l and especially from 5 to 100 g/l.

The composition preferably contains at least one type of cation selected from cations of cerium, chromium, iron, calcium, cobalt, copper, magnesium, manganese, molybdenum, nickel, niobium, tantalum, yttrium, zinc, tin and other lanthanides, and/or at least one corresponding compound. Preferably, not all the cations present in the aqueous composition have been not only dissolved out of the metallic surface by the aqueous composition, but also at least partially or even extensively added to the aqueous composition. A freshly prepared bath can therefore be free of certain cations or compounds which are only freed or formed from reactions with metallic materials or from reactions in the bath.

Surprisingly, the addition of manganese ions or at least one manganese compound has been shown to be particularly advantageous. Although apparently no manganese compound or almost no manganese compound is deposited on the metallic surface, this addition clearly promotes the deposition of silane/silanol/siloxane/polysiloxane, thereby significantly improving the properties of the coating. Unexpectedly, an addition of magnesium ions or at least one magnesium compound has also been shown to be advantageous, since this addition promotes the deposition of titanium and/or zirconium compounds, probably as oxide and/or hydroxide, on the metallic surface and thus markedly improves the properties of the coating. A combined addition of magnesium and manganese improves the coatings still further in some cases. By contrast, an addition of only 0.02 g/l of copper ions has not yet been shown to have a significant influence. If the calcium ion content is increased, care should be taken to ensure that a complex fluoride is not destabilized by the formation of calcium fluoride.

Preferably, the composition has a content of at least one type of cation and/or corresponding compounds, selected from alkaline earth metal ions, ranging from 0.01 to 50 g/l, calculated as corresponding compounds, particularly preferably from 0.03 to 35 g/l, very particularly preferably from 0.06 to 20 g/l and especially from 0.1 to 8 g/l. The alkaline earth metal ions or corresponding compounds can help to reinforce the deposition of compounds based on titanium and/or zirconium, which is often advantageous especially for increasing the corrosion resistance. On the other hand, the content of these compounds in the concentrate, for example in concentrate B free of silane/silanol/siloxane/polysiloxane, can range preferably from 0.1 to 100 g/l, calculated as the sum of the corresponding compounds, particularly preferably from 0.3 to 80 g/l, very particularly preferably from 0.6 to 60 g/l and especially from 0.5 to 30 g/l.

Preferably, the composition has a content of at least one type of cation, selected from cations of iron, cobalt, magnesium, manganese, nickel, yttrium, zinc and lanthanides, and/or of at least one corresponding compound c), ranging especially from 0.01 to 20 g/l, calculated as the sum of the metals. This content ranges particularly preferably from 0.03 to 15 g/l, very particularly preferably from 0.06 to 10 g/l and especially from 0.1 to 6 g/l. On the other hand, the content of these compounds in the concentrate, for example in concentrate B free of silane/silanol/siloxane/polysiloxane, can preferably range from 1 to 240 g/l, calculated as the sum of the metals. This content ranges particularly preferably from 2 to 180 g/l, very particularly preferably from 3 to 140 g/l and especially from 5 to 100 g/l.

Preferably, the composition contains at least one organic compound d) selected from monomers, oligomers, polymers, copolymers and block copolymers, especially at least one compound based on acrylic, epoxide and/or urethane. At least one organic compound having at least one silyl group can also be used here, in addition or as an alternative. It is preferred in some embodiments to use such organic compounds having a content or a higher content of OH groups, amine groups, carboxylate groups, isocyanate groups and/or isocyanurate groups.

Preferably, the composition has a content of at least one organic compound d), selected from monomers, oligomers, polymers, copolymers and block copolymers, ranging from 0.01 to 200 g/l, calculated as added solids. This content ranges particularly preferably from 0.03 to 120 g/l, very particularly preferably from 0.06 to 60 g/l and especially from 0.1 to 20 g/l. In some embodiments, such organic compounds can help to homogenize the formation of the coating. These compounds can contribute to the formation of a more compact, denser, more chemically resistant and/or more water-resistant coating, compared with coatings based on silane/silanol/siloxane/polysiloxane etc. without these compounds. The hydrophilicity/hydrophobicity can also be adjusted according to the desired objective by the choice of organic compound(s). However, a strongly hydrophobic coating is problematic in some applications because of the required bonding of especially water-based lacquers, although a stronger hydrophobicity can be established in the case of powder coatings in particular. When using an addition of at least one organic compound, a combination with compounds having a certain functionality can prove particularly advantageous, examples being compounds based on amines/diamines/polyamines/urea/imines/diimines/polyimines or derivatives thereof, compounds based in particular on capped isocyanate/isocyanurate/melamine compounds, and compounds with carboxyl and/or hydroxyl groups, e.g. carboxylates, longer-chain sugar-like compounds, e.g. (synthetic) starch, cellulose, saccharides, long-chain alcohols and/or derivatives thereof. The long-chain alcohols added are especially those having 4 to 20 C atoms, such as a butanediol, a butyl glycol, a butyl diglycol, an ethylene glycol ether such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether, diethylene glycol hexyl ether, or a propylene glycol ether such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether or propylene glycol phenyl ether, trimethylpentanediol diisobutyrate, a polytetrahydrofuran, a polyetherpolyol and/or a polyesterpolyol.

The weight ratio of compounds based on silane/silanol/siloxane/polysiloxane, calculated on the basis of the corresponding silanols, to compounds based on organic polymers, calculated as added solids, in the composition, ranges preferably from 1:0.05 to 1:3, particularly preferably from 1:0.1 to 1:2 and very particularly preferably from 1:0.2 to 1:1. In some embodiments, this ratio ranges preferably from 1:0.05 to 1:30, particularly preferably from 1:0.1 to 1:2, very particularly preferably from 1:0.2 to 1:20 and especially from 1:0.25 to 1:12, from 1:0.3 to 1:8 or from 1:0.35 to 1:5.

It has now been found, surprisingly, that an addition of organic polymer and/or copolymer, in particular, markedly improves the corrosion resistance, especially on iron and steel, and is of particular advantage for a higher process safety and constantly good coating properties.

Acetic acid, for example, can be added as a catalyst for the hydrolysis of a silane. The pH of the bath can be raised e.g. with ammonia/ammonium hydroxide, an alkali-metal hydroxide and/or a compound based on amine, such as monoethanolamine, while the pH of the bath is preferably lowered with acetic acid, hydroxyacetic acid and/or nitric acid. Such additions belong to the substances that influence the pH.

The composition optionally has a content of silicon-free compounds having at least one amino, urea and/or ureido group, especially amine/diamine/polyamine/urea/imine/diimine/polyimine compounds and derivatives thereof, ranging preferably from 0.01 to 10 g/l, calculated as the sum of the corresponding compounds. This content ranges particularly preferably from 0.03 to 7 g/l, very particularly preferably from 0.06 to 4 g/l and especially from 0.1 to 1 g/l. It is preferable to add at least one compound such as aminoguanidine, monoethanolamine, triethanolamine and/or a branched urea derivative with an alkyl radical. An addition of aminoguanidine, for example, markedly improves the properties of the coatings according to the invention.

On the other hand, the composition can also contain nitroguanidine. It has now been found, surprisingly, that an addition of nitroguanidine, in particular, to the aqueous composition makes the appearance of the coatings according to the invention very homogeneous and perceptibly increases the coating quality. This has a very positive effect especially on "sensitive" metallic surfaces such as sand-blasted iron or steel surfaces. An addition of nitroguanidine noticeably improves the properties of the coatings according to the invention. A content of nitrite can markedly reduce the rusting tendency particularly of steel surfaces. It has now been found, unexpectedly, that an addition of hydrogen peroxide to the aqueous composition according to the invention improves the optical quality of the coated substrates.

Optionally, the composition also contains phosphorus-containing compounds, especially as oxyanions and/or corresponding compounds, but preferably no aluminium phosphate. This content ranges particularly preferably from 0.05 to 8 g/l, very particularly preferably from 0.1 to 5 g/l and especially from 0.2 to 2 g/l. These compounds can be at least one orthophosphate, at least one oligomeric and/or polymeric phosphate and/or at least one phosphonate. The at least one orthophosphate and/or salts thereof and/or esters thereof can be e.g. at least one alkali-metal phosphate, at least one orthophosphate containing iron, manganese and/or zinc, and/or at least one of their salts and/or esters. Instead or in addition, it is also possible to add in each case at least one metaphosphate, polyphosphate, pyrophosphate, triphosphate and/or salts thereof and/or esters thereof. As phosphonate it is possible to add e.g. at least one phosphonic acid, such as at least one alkyldiphosphonic acid, and/or salts thereof and/or esters thereof. It has now been found, surprisingly, that an addition of orthophosphate to the aqueous composition according to the invention markedly improves the quality of the coatings, especially on electro-galvanized substrates. The phosphorus-containing compounds of this group of substances are not surfactants.

Optionally, the aqueous composition contains at least one type of anion selected from carboxylates, e.g. acetate, butyrate, citrate, formate, fumarate, glycolate, hydroxyacetate, lactate, laurate, maleate, malonate, oxalate, propionate, stearate and tartrate, and/or at least one corresponding undissociated and/or only partially dissociated compound.

Preferably, the composition has a content of carboxylate anions and/or carboxylate compounds ranging from 0.01 to 3 g/l, calculated as the sum of the corresponding compounds. This content ranges particularly preferably from 0.05 to 1.5 g/l, very particularly preferably from 0.1 to 0.8 g/l and especially from 0.15 to 0.6 g/l. Particularly preferably, in each case at least one citrate, lactate, oxalate and/or tartrate can be added as carboxylate. The addition of at least one carboxylate can help to complex a cation and keep it in solution more easily, thereby making it possible to increase the stability and controllability of the bath. Surprisingly, it has been found that the bonding of a silane to the metallic surface can in some cases be facilitated and improved by a carboxylate content.

Optionally, the composition also contains nitrate. The nitrate content preferably ranges from 0.01 to 2 g/l, calculated as the sum of the corresponding compounds. This content ranges particularly preferably from 0.03 to 1.2 g/l, very particularly preferably from 0.06 to 0.8 g/l and especially from 0.1 to 3.5 g/l. Nitrate can help to homogenize the formation of the coating, especially on steel. Nitrite may be converted to nitrate, usually only partially. Nitrate can be added especially as an alkali-metal nitrate, ammonium nitrate, a heavy metal nitrate, nitric acid and/or a corresponding organic compound. The nitrate can markedly reduce the rusting tendency, especially on steel and iron surfaces. The nitrate can optionally contribute to the formation of a defect-free coating and/or an exceptionally even coating that may be free of optically recognizable marks.

Optionally, the composition contains at least one type of cation selected from alkali-metal ions, ammonium ions and corresponding compounds, especially potassium and/or sodium ions, or at least one corresponding compound.

Optionally, the composition has a free fluoride content ranging from 0.001 to 3 g/l, calculated as $F^-$. This content ranges preferably from 0.01 to 1 g/l, particularly preferably from 0.02 to 0.5 g/l and very particularly preferably up to 0.1 g/l. It has been determined that it is advantageous in many embodiments to have a low free fluoride content in the bath because the bath can then be stabilized in many embodiments. An excessively high free fluoride content can sometimes adversely affect the deposition rate of cations. In addition, undissociated and/or uncomplexed fluoride can also occur in many cases, especially in the range from 0.001 to 0.3 g/l. On the other hand, the content of these compounds in the concentrate, for example in concentrate B free of silane/silanol/siloxane/polysiloxane, can preferably range from 0.05 to 5 g/l, calculated as the sum of $MeF_6$. This content ranges particularly preferably from 0.02 to 3 g/l, very particularly preferably from 0.01 to 2 g/l and especially from 0.005 to 1 g/l. Such an addition is preferably made in the form of hydrofluoric acid and/or its salts.

Optionally, the composition has a content of at least one fluoride-containing compound and/or fluoride anions, calculated as $F^-$ and without including complex fluorides, especially at least one fluoride from alkali metal fluoride(s), ammonium fluoride and/or hydrofluoric acid, ranging particularly preferably from 0.001 to 12 g/l, very particularly preferably from 0.005 to 8 g/l and especially from 0.01 to 3 g/l. The fluoride ions or corresponding compounds can help to control the deposition of the metal ions on the metallic surface so that, for example, the deposition of the at least one zirconium compound can be increased or decreased as required. On the other hand, the content of these compounds in the concentrate, for example in concentrate B free of silane/silanol/siloxane/polysiloxane, can preferably range from 0.1 to 100 g/l, calculated as the sum of the corresponding compounds. This content ranges particularly preferably from 0.3 to 80 g/l, very particularly preferably from 0.6 to 60 g/l and especially from 1 to 30 g/l. The weight ratio of the sum of the complex fluorides, calculated as the sum of the associated metals, to the sum of the free fluorides, calculated as $F^-$, is preferably greater than 1:1, particularly preferably greater than 3:1, very particularly preferably greater than 5:1 and especially greater than 10:1.

In the process according to the invention, the aqueous composition can optionally contain at least one compound selected from alkoxides, carbonates, chelates, surfactants and additives, e.g., biocides and/or defoamers.

The aforementioned additions normally have a beneficial effect in the aqueous compositions according to the invention in that they help to further improve the good properties of the aqueous base composition according to the invention consisting of components a), b) and solvent(s). These additions normally act in the same way if only one titanium compound or only one zirconium compound, or a combination thereof, is used. However, it has been shown, surprisingly, that the combination of at least one titanium compound and at least one zirconium compound, especially as complex fluorides, significantly improves the properties particularly of the coatings produced therewith. Surprisingly, the different additives thus function as in a modular system and make a substantial contribution to optimization of the particular coating. In the specific case where a so-called multimetal mix is used, as often occurs in the pretreatment of car bodies and in the treatment or pretreatment of different hardware or assembly parts, the aqueous composition according to the invention has proved very suitable since the composition containing the various additives can be specifically optimized to the particular multimetal mix and its peculiarities and requirements.

With the process according to the invention, a mix of different metallic materials, e.g. as in the case of car bodies or different hardware, can be coated with the aqueous coating in the same bath. Here, for example, any desired mix of substrates with metallic surfaces, selected from cast iron, steel, aluminium, aluminium alloys, magnesium alloys, zinc and zinc alloys, can be coated simultaneously and/or successively according to the invention, it being possible for the substrates to be at least partially coated with metal and/or to consist at least partially of at least one metallic material.

Provided at least one other component and/or traces of other substances are not present, the remainder to 1000 g/l consists of water or of water and at least one organic solvent such as ethanol, methanol, isopropanol or dimethylformamide (DMF). Preferably, in most embodiments, the organic solvent content is particularly low or zero. Because of the hydrolysis of the at least one silane present, a content especially of ethanol and/or methanol can appear. It is particularly preferable not to add any organic solvent.

The composition is preferably free or substantially free of all types of particles, or particles with a mean diameter greater than 0.02 µm, which might be added e.g. in the form of oxides such as $SiO_2$.

The composition is preferably poor in, substantially free of or free of larger contents or contents exceeding 1 g/l of water hardeners such as calcium. The aqueous composition is preferably free of or poor in lead, cadmium, chromate, cobalt, nickel and/or other toxic heavy metals. Preferably, such substances are not deliberately added, although at least one heavy metal, dissolved out of a metallic surface, can be entrained e.g. from another bath and/or can occur as an impurity. The composition is preferably poor in, substantially free of or totally free of bromide, chloride and iodide, since these can contribute to corrosion under certain circumstances.

The layer thickness of the coatings produced according to the invention ranges preferably from 0.005 to 0.3 µm, particularly preferably from 0.01 to 0.25 µm and very particularly preferably from 0.02 to 0.2 µm, and is frequently about 0.04 µm, about 0.06 µm, about 0.08 µm, about 0.1 µm, about 0.12 µm, about 0.14 µm, about 0.16 µm or about 0.18 µm. The coatings containing organic monomer, oligomer, polymer, copolymer and/or block copolymer are often somewhat thicker than those that are free or almost free thereof.

Preferably, the composition forms a coating with a layer weight which, based only on the titanium and/or zirconium content, ranges from 1 to 200 mg/m$^2$, calculated as elemental titanium. This layer weight ranges particularly preferably from 5 to 150 mg/m$^2$ and very particularly preferably from 8 to 120 mg/m$^2$ and, in particular, is about 10, about 20, about 30, about 40, about 50, about 60, about 70, about 80, about 90, about 100 or about 110 mg/m$^2$.

Preferably, the composition forms a coating with a layer weight which, based only on siloxanes/polysiloxanes, ranges from 0.2 to 1000 mg/m$^2$, calculated as the corresponding extensively condensed polysiloxane. This layer weight ranges particularly preferably from 2 to 200 mg/m$^2$ and very particularly preferably from 5 to 150 mg/m$^2$ and, in particular, is about 10, about 20, about 30, about 40, about 50, about 60, about 70, about 80, about 90, about 100, about 110, about 120, about 130 or about 140 mg/m$^2$.

If necessary, the coating produced with the aqueous composition according to the invention can then be coated with at least one primer, lacquer or adhesive and/or with a lacquer-like organic composition, optionally at least one of these other coatings being cured by heating and/or irradiation.

The metallic substrates coated by the process according to the invention can be used in the automobile industry, for railway vehicles, in the aerospace industry, in apparatus engineering, in mechanical engineering, in the building industry, in the furniture industry, for the manufacture of crash barriers, lamps, profiles, sheathing or hardware, for the manufacture of car bodies or body parts, individual components or preassembled/connected elements, preferably in the automobile or aeronautical industry, or for the manufacture of appliances or installations, especially household appliances, control devices, testing devices or structural elements.

An addition of manganese has surprisingly proved particularly advantageous: Although apparently no or almost no manganese compound is deposited on the metallic surface, the addition greatly promotes the deposition of silane/silanol/siloxane/polysiloxane on the metallic surface. When adding nitroguanidine, it was found, surprisingly, that the optical characteristics of the coated metallic sheets are very uniform, especially on sensitive surfaces such as sand-blasted iron or steel surfaces. Unexpectedly, an addition of nitrite markedly reduced the rusting tendency of steel substrates. It was found, surprisingly, that every addition mentioned in the present patent application as having a significantly positive effect has an additive effect on improving the coating according to the invention: Choosing several additions, in a similar manner to a modular system, enables the different properties, especially of a multimetal system, to be further optimized.

It has now been found, surprisingly, that a good multimetal treatment with a single aqueous composition is only possible if a complex fluoride has been used, and that a very good multimetal treatment with a single aqueous composition is only possible if at least two different complex fluorides are used, e.g. those based on titanium and zirconium. In a very wide variety of experiments, the results obtained for complex fluorides used individually were never as good as those obtained for the combination of these two complex fluorides, independently of what other additions were made.

The possibility of such a large increase in quality of aqueous compositions containing silane/silanol/siloxane/polysiloxane could not be anticipated. Surprisingly, however, a marked increase in the level of quality in all tests was also found when using aqueous compositions based on a silane and only one titanium-based or zirconium-based complex fluoride (cf. Comparative Examples CE 3 and CE 4).

It was further surprising that, when testing the lacquer adhesion, stone chip resistance scores of 1 or 2 were obtained, even on steel: Steel has proved to be the most problematic material for aqueous compositions based on a silane and only one titanium-based or zirconium-based complex fluoride, especially in terms of the corrosion resistance (cf., for example, E 2).

In the case of aluminium and aluminium alloys, experience shows that the CASS test is problematic, but this also turned out markedly better than expected with the compositions according to the invention.

EXAMPLES AND COMPARATIVE EXAMPLES

The Examples according to the invention (E) and Comparative Examples (CE) described below are intended to illustrate the subject matter of the invention in greater detail.

The aqueous bath compositions are prepared as mixtures according to Table 1 using already prehydrolysed silanes. They each contain predominantly one silane and optionally also have small contents of at least one other similar silane, where here again the word silane is used rather than silane/silanol/siloxane/polysiloxane by way of simplification, and where normally these various compounds, sometimes in a larger number of similar compounds, also pass through into the formation of the coating, so there are often several similar compounds present in the coating as well. Depending on the silane, the prehydrolysis step can also take several days at room temperature, with vigorous stirring, if the silanes to be used are not already present in prehydrolysed form. The prehydrolysis of the silane is carried out by placing the silane in excess water and optionally catalysing with acetic acid. Acetic acid was added in only a few embodiments for the sole purpose of adjusting the pH. In some embodiments, acetic acid is already present as a hydrolysis catalyst. Ethanol is formed in the hydrolysis, but is not added. The finished mixture is used fresh.

Then, for each test, at least 3 sheets of cold-rolled steel (CRS), aluminium alloy Al 6016, steel hot-dip galvanized or electrogalvanized on both sides, or Galvaneal® (ZnFe layer on steel), previously cleaned with an aqueous alkaline cleaner and rinsed with industrial water and then with demineralised water, are brought into contact on both sides with the appropriate pretreatment liquid in Table 1 at 25° C. by spraying, dipping or rollcoater treatment. The sheets treated in this way were then dried at 90° C. PMT and subsequently lacquered with a cathodic automobile dip lacquer (CDL). These sheets were then provided with a complete commercial automotive lacquer system (filler, covering lacquer, transparent lacquer; overall thickness of stacked layers, including CDL, approx. 105 µm) and tested for their corrosion protection and lacquer adhesion. The compositions and properties of the treatment baths and the properties of the coatings are collated in Table 1.

The organofunctional silane A is an amino-functional trialkoxysilane and has one amino group per molecule. Like all the silanes used here, it is in extensively or almost completely hydrolysed form in the aqueous solution. The organofunctional silane B has one terminal amino group and one ureido group per molecule. The non-functional silane C is a bis-trialkoxysilane; the corresponding hydrolysed molecule has up to 6 OH groups on two silicon atoms. The polysiloxane D has a relatively short-chain molecule with a terminal OH group. It renders the coating hydrophobic.

The complex fluorides of aluminium, silicon, titanium or zirconium are used extensively in the form of an $MeF_6$ complex, but the complex fluorides of boron are used extensively in the form of an $MeF_4$ complex. Manganese is added to the particular complex fluoride solution as metallic manganese and dissolved therein. This solution is mixed with the aqueous composition. If no complex fluoride is used, manganese nitrate is added. Copper is added as copper(II) nitrate and magnesium as magnesium nitrate. Iron and zinc are mixed in as the nitrates. Nitrate on its own is preferably added as sodium nitrate or nitric acid. Epoxy polymer A contains $OH^-$ and isocyanate groups and can therefore subsequently be chemically crosslinked at temperatures above 100° C. Epoxy polymer B also contains $OH^-$ and isocyanate groups and likewise can therefore subsequently be chemically crosslinked at temperatures above 100° C. Polymer B is more stable than polymer A in the bath when using the chosen compositions according to the invention. Silylated epoxy polymer C has a small content of $OH^-$ and isocyanate groups and can therefore also subsequently be chemically crosslinked at temperatures above 100° C.

The silanes present in the aqueous composition—concentrate and/or bath—are monomers, oligomers, polymers, copolymers and/or reaction products with other components due to hydrolysis reactions, condensation reactions and/or other reactions. The reactions take place especially in the solution, during drying or optionally also during curing of the coating, especially at temperatures above 70° C. All the concentrates and baths proved to be stable for one week without undergoing changes or precipitations. No ethanol was added. Ethanol contents in the compositions originated only from chemical reactions.

In the majority of Examples and Comparative Examples, the pH is adjusted with ammonia if at least one complex fluoride is present and with an acid in other cases. All the baths have a good solution quality and almost always a good stability. There are no precipitations in the baths. After the coating step with the silane-containing solution, the coating is firstly rinsed briefly once with demineralized water. The coated sheets are then dried at 120° C. in an oven for 5 minutes. Because of the interference colours, only the coatings on steel can be significantly examined visually, allowing an assessment of the homogeneity of the coating. The coatings without any complex fluoride content are very inhomogeneous. Surprisingly, a coating with titanium complex fluoride and zirconium complex fluoride proved to be markedly more homogeneous than when only one of these complex fluorides had been applied. An addition of nitroguanidine, nitrate or nitrite likewise improves the homogeneity of the coating. In some cases the layer thickness increases with the concentration of these substances.

TABLE 1

Bath compositions in g/l, based on solids contents or, in the case of silanes, on the weight of the hydrolysed silanes; residual content: water and usually a very small amount of ethanol; process data and properties of the coatings

| | Example/CE | | | | | | | | | |
|---|---|---|---|---|---|---|---|---|---|---|
| | CE 1 | CE 2 | CE 3 | CE 4 | E 1 | E 2 | E 3 | E 4 | E 5 | E 6 |
| Organofunct. silane A | 0.2 | — | 0.2 | 0.2 | 0.2 | 0.2 | 0.2 | 0.2 | 0.2 | 0.2 |
| Organofunct. silane B | — | — | — | — | — | — | — | — | — | — |
| Non-funct. silane C | — | 0.2 | — | — | — | — | — | — | — | — |
| $H_2TiF_6$ as Ti | — | — | 0.2 | — | 0.1 | 0.1 | 0.5 | 0.5 | 0.3 | 0.2 |
| $H_2ZrF_6$ as Zr | — | — | — | 0.2 | 0.1 | 0.5 | 0.1 | 0.5 | 0.3 | 0.2 |
| Mn | — | — | — | — | — | — | — | — | — | — |
| Acetic acid | — | 0.02 | — | — | — | — | — | — | — | — |
| pH | 10.5 | 5 | 4 | 4 | 4 | 4 | 4 | 4 | 4 | 4 |
| BMW cross-cut test: score | | | | | | | | | | |
| Steel | 4 | 3 | 5 | 3 | 2 | 0 | 1-2 | 1 | 1-2 | 2 |
| E-zinc on steel | 3 | 4 | 4 | 4 | 2 | 2 | 0 | 0 | 1 | 1-2 |
| Hot-dip zinc on steel | 2 | 5 | 4 | 4 | 1-2 | 1 | 0 | 0 | 0 | 1 |
| Al 6016 | 2 | 3 | 2 | 2 | 1-2 | 0 | 1 | 0 | 1 | 1 |
| Galvaneal ® | 1 | 2 | 1 | 2 | 1 | 0 | 0 | 0 | 0 | 1 |
| 10 VDA cycles, mm disbonding | | | | | | | | | | |
| Steel | 8 | 7 | 7 | 4 | 2 | 1.5 | 2.5 | 1.5 | 1.5 | 3 |
| E-zinc on steel | 5 | 5 | 3 | 4 | 1.5 | 2 | 1 | 1 | 1 | 2 |
| Hot-dip zinc on steel | 4 | 5 | 2.5 | 3.5 | <1 | <1 | <1 | <1 | <1 | <1 |
| Galvaneal ® | 2 | 3 | 2 | 1.5 | <1 | <1 | <1 | <1 | <1 | <1 |
| Stone chip resistance after VDA stress: score | | | | | | | | | | |
| Steel | 5 | 5 | 4 | 4 | 2-3 | 1 | 3 | 1 | 1 | 2-3 |
| E-zinc on steel | 5 | 5 | 3 | 4 | 2 | 2-3 | 1 | 1 | 1-2 | 2 |
| Hot-dip zinc on steel | 5 | 5 | 3 | 4 | 2 | 2 | 1 | 1 | 1 | 1 |
| Galvaneal ® | 4 | 4 | 2 | 3 | 2 | 1 | 1 | 0 | 0 | 1-2 |
| Salt spray test, 1008 h | | | | | | | | | | |
| Steel | 7 | 8 | 4 | 3.5 | 3 | 2 | 2.5 | 2 | 1.8 | 2 |
| CASS test, mm disbonding | | | | | | | | | | |
| Al 6016 | 6 | 5 | 3.5 | 3.5 | 3 | 3 | 2.5 | 2.5 | 2 | 2.5 |

| | Example/CE | | | | | | | | | |
|---|---|---|---|---|---|---|---|---|---|---|
| | E 7 | E 8 | E 9 | E 10 | E 11 | E 12 | E 13 | E 14 | E 15 | CE 5 |
| Organofunct. silane A | 0.2 | 0.2 | 0.2 | 0.2 | 0.1 | 0.3 | 0.2 | 0.1 | — | 0.2 |
| Organofunct. silane B | — | — | — | — | — | — | — | 0.1 | — | — |
| Non-funct. silane C | — | — | — | — | — | — | 0.1 | — | 0.2 | — |
| $H_2TiF_6$ as Ti | 0.3 | 0.3 | 0.2 | 0.4 | 0.2 | 0.2 | 0.2 | 0.2 | 0.2 | — |
| $H_2ZrF_6$ as Zr | 0.2 | 0.4 | 0.3 | 0.3 | 0.2 | 0.2 | 0.2 | 0.2 | 0.2 | — |
| Mn | — | — | — | — | — | — | — | — | — | 0.3 |
| Acetic acid | — | — | — | — | — | — | 0.01 | — | — | 0.35 |
| pH | 4 | 4 | 4 | 4 | 4 | 4 | 4 | 4 | 4 | 4.5 |
| BMW cross-cut test: score | | | | | | | | | | |
| Steel | 2 | 1 | 1 | 1 | 2 | 1 | 1 | 1 | 2 | 2-3 |
| E-zinc on steel | 1 | 0 | 1-2 | 0 | 2 | 1 | 2 | 0 | 2 | 3 |
| Hot-dip zinc on steel | 0 | 0 | 1 | 0 | 1 | 0 | 1 | 0 | 3 | 2 |
| Al 6016 | 1 | 0-1 | 1 | 0 | 1 | 1 | 1 | 0 | 2 | 3 |

TABLE 1-continued

Bath compositions in g/l, based on solids contents or, in the case of silanes, on the weight of the hydrolysed silanes; residual content: water and usually a very small amount of ethanol; process data and properties of the coatings

| Galvaneal ® 10 VDA cycles, mm disbonding | 0 | 0 | 1 | 0 | 1 | 0 | 0-1 | 0 | 1 | 2 |
|---|---|---|---|---|---|---|---|---|---|---|
| Steel | 3 | 1.5 | 2 | 1.5 | 2.5 | 2 | 2.5 | 1.8 | 3 | 7 |
| E-zinc on steel | 1.5 | 1.5 | 2 | 1.5 | 2.5 | 1.5 | 2 | 1 | 2.5 | 5 |
| Hot-dip zinc on steel | <1 | <1 | <1 | <1 | <1 | <1 | 1 | <1 | 2 | 4 |
| Galvaneal ® Stone chip resistance after VDA stress: score | <1 | <1 | <1 | <1 | <1 | <1 | 1 | 0 | 0 | 3 |
| Steel | 2-3 | 2 | 1-2 | 1-2 | 2 | 1 | 2 | 1-2 | 3 | 5 |
| E-zinc on steel | 1 | 1 | 1-2 | 1 | 1-2 | 1 | 2 | 1 | 2 | 4 |
| Hot-dip zinc on steel | 1 | 1 | 1 | 0-1 | 1 | 0 | 1 | 1 | 1 | 4 |
| Galvaneal ® Salt spray test, 1008 h | 1 | 0 | 0 | 0 | 1 | 0 | 1 | 1 | 1 | 4 |
| Steel CASS test, mm disbonding | 2.5 | 2 | 2 | 2.5 | 3 | 2 | 2 | 1.5 | 2.5 | 7 |
| Al 6016 | 3 | 2.5 | 2 | 2 | 2.5 | 3 | 2 | 2.5 | 2 | 6 |

| | Example/CE | | | | | | | |
|---|---|---|---|---|---|---|---|---|
| | E 16 | E 17 | E 18 | E 19 | E 20 | E 21 | CE 6 | E 22 |
| Organofunct. silane A | 0.2 | 0.2 | 0.2 | 0.2 | 0.2 | 0.2 | 0.2 | 0.2 |
| Non-funct. silane C | — | — | — | 0.2 | — | — | — | — |
| $H_2TiF_6$ as Ti | 0.2 | 0.2 | 0.2 | 0.2 | 0.2 | 0.2 | — | 0.2 |
| $H_2ZrF_6$ as Zr | 0.2 | 0.2 | 0.2 | 0.2 | 0.2 | 0.2 | — | 0.2 |
| Mn | 0.1 | 0.3 | 0.5 | 0.5 | — | 0.3 | — | — |
| Cu | — | — | — | — | 0.02 | 0.02 | — | — |
| Mg | — | — | — | — | — | — | — | — |
| Epoxy polymer A | — | — | — | — | — | — | — | — |
| Silylated epoxy polymer C | — | — | — | — | — | — | 1 | 1 |
| Acetic acid | — | — | — | 0.02 | — | — | — | — |
| pH | 4 | 4 | 4 | 4 | 4 | 4 | 9 | 4 |
| BMW cross-cut test: score | | | | | | | | |
| Steel | 2 | 1 | 1 | 3 | 1 | 1 | 3 | 1 |
| E-zinc on steel | 2 | 1 | 1 | 2 | 1 | 1 | 3 | 0 |
| Hot-dip zinc on steel | 1 | 0 | 0 | 0 | 0 | 0 | 4 | 0 |
| Al 6016 | 1 | 1 | 1 | 0 | 1 | 1 | 2 | 1 |
| Galvaneal ® 10 VDA cycles, mm disbonding | 1 | 1 | 0 | 0 | 1 | 1 | 2 | 0 |
| Steel | 2 | 2 | 1.5 | 1.5 | 2 | 2 | 4 | 2.5 |
| E-zinc on steel | 1 | 1 | 1 | 1.5 | 1.5 | 1 | 4 | 1 |
| Hot-dip zinc on steel | 1 | <1 | <1 | <1 | <1 | <1 | 4 | <1 |
| Galvaneal ® Stone chip resistance after VDA stress: score | <1 | <1 | <1 | <1 | 0 | <1 | 3 | <1 |
| Steel | 2 | 1 | 1 | 1 | 1 | 1 | 4 | 1 |
| E-zinc on steel | 1-2 | 1 | 1 | 2 | 1 | 1 | 4 | 1 |
| Hot-dip zinc on steel | 1 | 1 | 0-1 | 1 | 0 | 1 | 4 | 0 |
| Galvaneal ® | 1 | 1 | 1 | 2 | 0 | 1 | 3 | 0 |

TABLE 1-continued

Bath compositions in g/l, based on solids contents or, in the case of silanes, on the weight of the hydrolysed silanes; residual content: water and usually a very small amount of ethanol; process data and properties of the coatings Salt spray test, 1008 h

| | | | | | | | | |
|---|---|---|---|---|---|---|---|---|
| Steel | 2 | 1.5 | 1 | 2.5 | 2.5 | 1.5 | 3.5 | 1 |

CASS test, mm disbonding

| | | | | | | | | |
|---|---|---|---|---|---|---|---|---|
| Al 6016 | 2 | 1.5 | 1.5 | 1 | 2.8 | 2 | 5 | 1.5 |

| | Example/CE | | | | | | |
|---|---|---|---|---|---|---|---|
| | E 23 | CE 7 | E 24 | E 25 | E 26 | E 27 | E 28 |
| Organofunct. silane A | 0.2 | 0.2 | 0.2 | 0.2 | 0.2 | 0.2 | 0.2 |
| Non-funct. silane C | — | — | — | — | — | — | — |
| $H_2TiF_6$ as Ti | 0.2 | — | 0.2 | 0.2 | 0.2 | 0.2 | 0.2 |
| $H_2ZrF_6$ as Zr | 0.2 | — | 0.2 | 0.2 | 0.2 | 0.2 | 0.2 |
| Mn | 0.3 | — | — | 0.3 | — | 0.3 | 0.2 |
| Cu | — | — | — | — | — | — | — |
| Mg | — | 0.3 | — | — | 0.3 | 0.3 | — |
| Epoxy polymer A | — | 1 | 1 | 1 | 1 | 1 | — |
| Silylated epoxy polymer C | 1 | — | — | — | — | — | 1 |
| Acetic acid | — | 0.3 | — | — | — | — | — |
| pH | 4 | 5 | 4 | 4 | 4 | 4 | 4 |

BMW cross-cut test: score

| | | | | | | | |
|---|---|---|---|---|---|---|---|
| Steel | 0 | 3 | 1 | 0 | 2 | 1 | 0 |
| E-zinc on steel | 0 | 3 | 0 | 0 | 2 | 1 | 0 |
| Hot-dip zinc on steel | 0 | 3 | 0 | 0 | 1 | 0 | 0 |
| Al 6016 | 1 | 3 | 1 | 1 | 1 | 0 | 0 |
| Galvaneal ® | 0 | 2 | 0 | 0 | 1 | 0 | 0 |

10 VDA cycles, mm disbonding

| | | | | | | | |
|---|---|---|---|---|---|---|---|
| Steel | 1.5 | 5 | 2 | 2 | 2.5 | 1.5 | 1.5 |
| E-zinc on steel | 1 | 4 | 1 | <1 | 2 | 1 | <1 |
| Hot-dip zinc on steel | <1 | 4 | <1 | <1 | 1.5 | <1 | <1 |
| Galvaneal ® | <1 | 4 | <1 | <1 | 1 | <1 | <1 |

Stone chip resistance after VDA stress: score

| | | | | | | | |
|---|---|---|---|---|---|---|---|
| Steel | 1 | 4 | 1-2 | 1-2 | 2-3 | 2 | 1 |
| E-zinc on steel | 1 | 4 | 1-2 | 1 | 2 | 1-2 | 1 |
| Hot-dip zinc on steel | 1 | 5 | 1 | 1 | 1 | 1 | 1 |
| Galvaneal ® | 1 | 3 | 1 | 1 | 1 | 1 | 1 |

Salt spray test, 1008 h

| | | | | | | | |
|---|---|---|---|---|---|---|---|
| Steel | 0.5 | 5 | 1.5 | 1.5 | 2.5 | 2 | 1.5 |

CASS test, mm disbonding

| | | | | | | | |
|---|---|---|---|---|---|---|---|
| Al 6016 | 1.5 | 6 | 1.5 | 1.5 | 2.5 | 2 | 1 |

| | Example/CE | | | | | | |
|---|---|---|---|---|---|---|---|
| | E 29 | E 30 | E 31 | E 32 | E 33 | E 34 | E 35 | E 36 |
| Organofunct. silane A | 0.2 | 0.2 | 0.2 | 0.2 | 0.1 | — | 0.2 | 0.1 |
| Organofunct. silane B | — | — | — | — | 0.2 | 0.2 | — | — |
| Non-funct. silane C | — | — | — | 0.1 | — | — | — | — |
| Polysiloxane D | — | — | — | — | — | — | — | — |

TABLE 1-continued

Bath compositions in g/l, based on solids contents or, in the case of silanes, on the weight of the hydrolysed silanes; residual content: water and usually a very small amount of ethanol; process data and properties of the coatings

|  |  |  |  |  |  |  |  |  |
|---|---|---|---|---|---|---|---|---|
| H$_2$TiF$_6$ as Ti | 0.2 | 0.2 | 0.2 | 0.2 | 0.2 | 0.2 | 0.2 | 0.3 |
| H$_2$ZrF$_6$ as Zr | 0.2 | 0.2 | 0.2 | 0.2 | 0.2 | 0.2 | — | 0.3 |
| Zr carbonate | — | — | — | — | — | — | 0.2 | — |
| Mn | 0.2 | 0.2 | 0.2 | 0.2 | 0.2 | 0.2 | 0.2 | — |
| Polymer B | 0.1 | 0.5 | 2.5 | — | — | — | — | — |
| Acetic acid | — | — | — | 0.01 | — | — | — | — |
| pH | 4 | 4 | 4 | 4 | 4 | 4 | 4 | 4 |
| BMW cross-cut test: score | | | | | | | | |
| Steel | — | — | — | — | 1 | 1 | — | 2 |
| E-zinc on steel | — | — | — | — | 1 | 1 | — | 1 |
| Hot-dip zinc on steel | — | — | — | — | 0-1 | 0-1 | — | 1 |
| Al 6016 | — | — | — | — | 1-2 | 1-2 | — | 1 |
| Galvaneal ® | — | — | — | — | 1 | 1 | — | 0 |
| 10 VDA cycles, mm disbonding | | | | | | | | |
| Steel | — | — | — | — | 2 | 2 | — | 1.5 |
| E-zinc on steel | — | — | — | — | 1.5 | 1.5 | — | 1 |
| Hot-dip zinc on steel | — | — | — | — | 1 | 1 | — | <1 |
| Galvaneal ® | — | — | — | — | 1 | 1 | — | <1 |
| Stone chip resistance after VDA stress: score | | | | | | | | |
| Steel | — | — | — | — | 1 | 1 | — | 1-2 |
| E-zinc on steel | — | — | — | — | 1-2 | 1-2 | — | 1-2 |
| Hot-dip zinc on steel | — | — | — | — | 1-2 | 1-2 | — | 1 |
| Galvaneal ® | — | — | — | — | 1-2 | 1-2 | — | 0-1 |
| Salt spray test, 1008 h | | | | | | | | |
| Steel | — | — | — | — | 1.5 | 1.5 | — | 2 |
| CASS test, mm disbonding | | | | | | | | |
| Al 6016 | — | — | — | — | 2 | 2 | — | 2 |

| | Example/CE | | | | | | | |
|---|---|---|---|---|---|---|---|---|
| | E 37 | E 38 | E 39 | E 40 | E 41 | CE 8 | E 42 | E 43 |
| Organofunct. silane A | 0.1 | 0.6 | 0.6 | 0.1 | — | — | 0.1 | — |
| Organofunct. silane B | — | — | — | 0.2 | 0.2 | — | — | — |
| Non-funct. silane C | — | — | — | — | — | — | — | — |
| Polysiloxane D | — | — | — | — | — | — | 0.1 | 0.2 |
| H$_2$TiF$_6$ as Ti | 0.3 | 0.1 | 0.1 | 0.2 | 0.2 | 0.2 | 0.2 | 0.2 |
| H$_2$ZrF$_6$ as Zr | 0.3 | 0.1 | 0.1 | 0.2 | 0.2 | — | 0.2 | 0.2 |
| Zr carbonate | — | — | — | — | — | — | — | — |
| Mn | 0.2 | — | 0.2 | 0.3 | 0.3 | — | 0.3 | 0.3 |
| Polymer B | — | — | — | — | — | — | — | — |
| Acetic acid | — | — | — | — | — | — | — | — |
| pH | 4 | 4 | 4 | 4 | 4 | 4 | 4 | 4 |
| BMW cross-cut test: score | | | | | | | | |
| Steel | — | — | — | 0-1 | 0-1 | — | — | — |
| E-zinc on steel | — | — | — | 1 | 1 | — | — | — |
| Hot-dip zinc on steel | — | — | — | 0 | 0 | — | — | — |
| Al 6016 | — | — | — | 1 | 1 | — | — | — |
| Galvaneal ® | — | — | — | 1 | 1 | — | — | — |
| 10 VDA cycles, mm disbonding | | | | | | | | |
| Steel | — | — | — | 1.5 | 1.5 | — | — | — |
| E-zinc on steel | — | — | — | 1 | 1 | — | — | — |

TABLE 1-continued

Bath compositions in g/l, based on solids contents or, in the case of silanes, on the weight of the hydrolysed silanes; residual content: water and usually a very small amount of ethanol; process data and properties of the coatings

| | | | | | | | | |
|---|---|---|---|---|---|---|---|---|
| Hot-dip zinc on steel | — | — | — | 1 | 1 | — | — | — |
| Galvaneal ® | — | — | — | <1 | <1 | — | — | — |

Stone chip resistance after VDA stress: score

| | | | | | | | | |
|---|---|---|---|---|---|---|---|---|
| Steel | — | — | — | 0-1 | 0-1 | — | — | — |
| E-zinc on steel | — | — | — | 1 | 1 | — | — | — |
| Hot-dip zinc on steel | — | — | — | 1 | 1 | — | — | — |
| Galvaneal ® | — | — | — | 1 | 1 | — | — | — |

Salt spray test, 1008 h

| | | | | | | | | |
|---|---|---|---|---|---|---|---|---|
| Steel | — | — | — | 1 | 1 | — | — | — |

CASS test, mm disbonding

| | | | | | | | | |
|---|---|---|---|---|---|---|---|---|
| Al 6016 | — | — | — | 1.5 | 1.5 | — | — | — |

| | Example/CE | | | | | | | |
|---|---|---|---|---|---|---|---|---|
| | E 44 | E 45 | CE 9 | CE 10 | E 46 | E 47 | E 48 | E 49 |
| Organofunct. silane A | 0.2 | 0.2 | 0.2 | 0.2 | 0.2 | 0.2 | 0.2 | 0.2 |
| $H_2TiF_6$ as Ti | — | — | — | — | — | — | 0.2 | — |
| $H_2ZrF_6$ as Zr | — | — | — | — | — | 0.2 | — | 0.2 |
| $H_3AlF_6$ as Al | 0.2 | — | — | 0.2 | 0.2 | 0.2 | 0.2 | — |
| $H_2BF_4$ as B | — | 0.2 | — | 0.2 | 0.2 | — | — | 0.2 |
| $H_2SiF_6$ as Si | — | — | 0.2 | — | — | — | — | — |
| Ti nitrate | — | — | — | — | — | — | — | — |
| Zr nitrate | — | — | — | — | — | — | — | — |
| Mn | 0.3 | 0.3 | 0.3 | — | 0.3 | 0.3 | 0.3 | 0.3 |
| Fe | — | — | — | — | — | — | — | — |
| Zn | — | — | — | — | — | — | — | — |
| pH | 4 | 4 | 4 | 4 | 4 | 4 | 4 | 4 |

| | Example/CE | | | | | | |
|---|---|---|---|---|---|---|---|
| | E 50 | E 51 | E 52 | E 53 | E 54 | E 55 | E 56 |
| Organofunct. silane A | 0.2 | 0.2 | 0.2 | 0.2 | 0.2 | 0.2 | 0.2 |
| $H_2TiF_6$ as Ti | 0.2 | — | 0.2 | 0.2 | 0.2 | 0.2 | 0.2 |
| $H_2ZrF_6$ as Zr | — | — | 0.2 | 0.2 | 0.2 | 0.2 | 0.2 |
| $H_3AlF_6$ as Al | — | — | — | — | — | — | — |
| $H_2BF_4$ as B | 0.2 | — | — | — | — | — | — |
| $H_2SiF_6$ as Si | — | — | — | — | — | — | — |
| Ti nitrate | — | 0.2 | — | — | — | — | — |
| Zr nitrate | — | 0.2 | — | — | — | — | — |
| Mn | 0.3 | 0.3 | 0.5 | — | — | — | 1 |
| Fe | — | — | 2 | 1 | — | 2 | 2 |
| Zn | — | — | — | — | 1 | 1 | 1 |
| pH | 4 | 4 | 4 | 4 | 4 | 4 | 4 |

Over the short period of use, all the bath compositions are found to be stable and satisfactory to apply. There are no precipitations and no colour changes, There are no differences in behaviour, visual impression or test results between the different Examples and Comparative Examples which can be attributed to the treatment conditions, e.g. application by spraying, dipping or rollcoater treatment. The films formed are transparent and almost all are extensively homogeneous. They do not colour the coating. The structure, gloss and colour of the metallic surface appear to be only slightly changed by the coating. If a titanium and/or zirconium complex fluoride is present, iridescent layers are formed, especially on steel surfaces. Combining several silanes has not so far brought about a significant improvement in the corrosion protection, but this cannot be ruled out. Furthermore, a content of $H_3AlF_6$ was found on aluminium-rich metallic surfaces due to corresponding reactions in the aqueous composition. Surprisingly, however, combining two or three complex fluorides in the aqueous composition has proved extremely beneficial.

The layer thickness of the coatings produced in this way—also dependent on the type of application, which was initially varied in specific experiments—ranged from 0.01 to 0.16 µm and usually from 0.02 to 0.12 µm and was often up to 0.08 µm, being markedly greater when organic polymer was added.

The corrosion protection scores in the cross-cut test according to DIN EN ISO 2409, after storage for 40 hours in 5% NaCl solution according to BMW specification GS 90011, range from 0 to 5, 0 representing the best values. In the salt spray/condensation water alternation test over 10 cycles according to VDA test sheet 621-415 with alternating corrosion stress between salt spray test, perspiration water test and drying interval, the disbonding is measured on one side from the scratch outwards and reported in mm, the disbonding ideally being as small as possible. In the stone chip resistance test according to DIN 55996-1, the coated metallic sheets are bombarded with scrap steel after the aforementioned VDA alternation test over 10 cycles: The damage picture is characterized by scores from 0 to 5, 0 representing the best results. In the salt spray test according to DIN 50021 SS, the coated sheets are exposed for up to 1008 hours to an atomized corrosive sodium chloride solution; the disbonding is then measured in mm from the scratch outwards, the scratch being made with a standard gouge down to the metallic surface, and the disbonding ideally being as small as possible. In the CASS test according to DIN 50021 CASS, the coated sheets made of an aluminium alloy are exposed for 504 hours to an atomized special corrosive atmosphere; the disbonding is then measured in mm from the scratch outwards and ideally is as small as possible.

Given that the development of the zinc/manganese/nickel phosphatizing of car bodies has spanned several decades, the phosphate layers of this type produced today are of extremely high quality. Nevertheless, contrary to expectation, it was possible to achieve the same high-quality properties with silane-containing coatings by means of aqueous silane-containing compositions that have only been in use for a few years, even though a greater effort was required.

Other experiments on car body elements have shown that the electrochemical conditions of the CDL bath may be very slightly adaptable to the different kind of coating, but otherwise that the outstanding properties obtained in laboratory experiments can be reproduced on car body elements.

The invention claimed is:

1. A process comprising coating a metallic surface with a composition, wherein said composition consists of
   a) from 0.02 to 1 g/L of at least one compound selected from the group consisting of a silane, a silanol, a siloxane and a polysiloxane, wherein the silane, the silanol, the siloxane or the polysiloxane contains at least one group selected from the group consisting of an amino group, a urea group and a ureido group;
   b) at least two complex fluorides of formula $MeF_6$ wherein Me is a metal selected from the group consisting of titanium, hafnium, zirconium, aluminum and boron; water, and
   c) at least one cation selected from the group consisting of cerium, chromium, iron, calcium cobalt, copper, magnesium, manganese, molybdenum, nickel, niobium, tantalum, yttrium, zinc, and tin;
   wherein the total amount of the complex fluorides ranges from 0.01 to 100 g/L.

2. The process of claim 1, wherein prior to drying, at least one member selected from the group consisting of a lacquer, a primer and an adhesive is applied to the coating.

3. The process according to claim 1, further comprising the step of applying a lacquer, a lacquer-like coating, a primer or an adhesive to the freshly applied silane-based coating that have not yet dried thoroughly.

4. The process according to claim 1, wherein the rinsing is conducted with demineralized water.

5. The process according to claim 1, wherein the coated surface is dried after rinsing.

6. The process according to claim 5, wherein the coated surface is dried after rinsing at a temperature of 120° C.

7. The process of claim 1, wherein the drying is conducted at a temperature above 70° C.

8. A process comprising coating a plurality of metallic surfaces in a bath of a composition consisting of
   a) at least one compound selected from the group consisting of a silane, a silanol, a siloxane and a polysiloxane ranging from 0.02 to 1 g/L and wherein the silane, the silanol, the siloxane or the polysiloxane has at least one member selected from the group consisting of an amino group, a urea group GP and a ureido group;
   b) at least two complex fluorides of formula $MeF_6$ wherein Me is a metal selected from the group consisting of titanium, hafnium, zirconium, aluminum and boron; water,
   c) at least one cation selected from the group consisting of cerium, chromium, iron, calcium cobalt, copper, magnesium, manganese, molybdenum, nickel, niobium, tantalum, yttrium, zinc, and tin, and
   d) at least one organic compound selected from monomers, oligomers, polymers, copolymers and block copolymers based on acrylic or urethane in a weight ratio of from 1:0.05 to 1:2 of compounds based on silane, silanol, siloxane or polysiloxane, calculated on the basis of the corresponding silanols, to compounds based on organic polymers, calculated as added solids, in the composition, and
   and
   rinsing the coating when freshly applied and prior to thorough drying; wherein said plurality of metallic surfaces comprise at least two different metals and said plurality of surfaces are coated in the same said bath, wherein the composition has a free fluoride content in the range of from 0.01 to 1 g/L, and wherein the total amount of the complex fluorides ranges from 0.01 to 100 g/L.

9. The process according to claim 8, wherein said weight ratio is 1:0.05.

10. The process according to claim 8, wherein said weight ratio is 1:2.

11. A process comprising coating a metallic surface with a composition, wherein said composition consists of
    at least one silane, siloxane or polysiloxane having at least one member selected from the group consisting of an amino group, a urea group and a ureido group;
    at least two compounds complex fluorides of formula $MeF_6$ wherein Me is a metal selected from the group consisting of titanium, hafnium, zirconium, aluminum and boron;
    water, and
    at least one cation selected from the group consisting of cerium, chromium, iron, calcium cobalt, copper, magnesium, manganese, molybdenum, nickel, niobium, tantalum, yttrium, zinc, and tin,
    wherein the total amount of the complex fluorides ranges from 0.01 to 100 g/L.

* * * * *